United States Patent

[11] 3,587,609

[72] Inventor Carmine V. Di Camillo
Silver Spring, Md.
[21] Appl. No. 800,164
[22] Filed Feb. 18, 1969
[45] Patented June 28, 1971
[73] Assignee Bowles Fluidics Corporation
Silver Spring, Md.

[54] SELF PRESSURIZING INTERACTION REGION
8 Claims, 1 Drawing Fig.

[52] U.S. Cl. .......... 137/81.5
[51] Int. Cl. .......... F15c 1/12
[50] Field of Search .......... 137/81.5

[56] References Cited

UNITED STATES PATENTS

| | | | |
|---|---|---|---|
| 3,261,372 | 7/1966 | Burton | 137/81.5 |
| 3,340,885 | 9/1967 | Bauer | 137/81.5 |
| 3,458,129 | 7/1969 | Woodson | 137/81.5X |
| 3,468,324 | 9/1969 | Schrader | 137/81.5 |
| 3,468,329 | 9/1969 | Mayer | 137/81.5 |
| 3,469,592 | 9/1969 | Kuczkowski et al. | 137/81.5 |

*Primary Examiner*—Samuel Scott
*Attorney*—Hurvitz, Rose and Greene

ABSTRACT: A fluidic amplifier circuit responds to a variable pressure input signal at a relatively low average pressure level to provide an amplified version of the pressure input signal at a substantially higher average pressure level. The circuit comprises a plurality of cascaded fluidic amplifier stages, the interaction regions of successive stages being maintained at respective successively increasing pressures by restricting vent flow from each stage as required. The interaction region pressure in any stage must not be so great relative to the average pressure level of the input signal for that stage as to prevent the input signal from flowing into that stage, nor so small relative to the power stream pressure as to cause excessive diffusion of the power stream upon entering the interaction region.

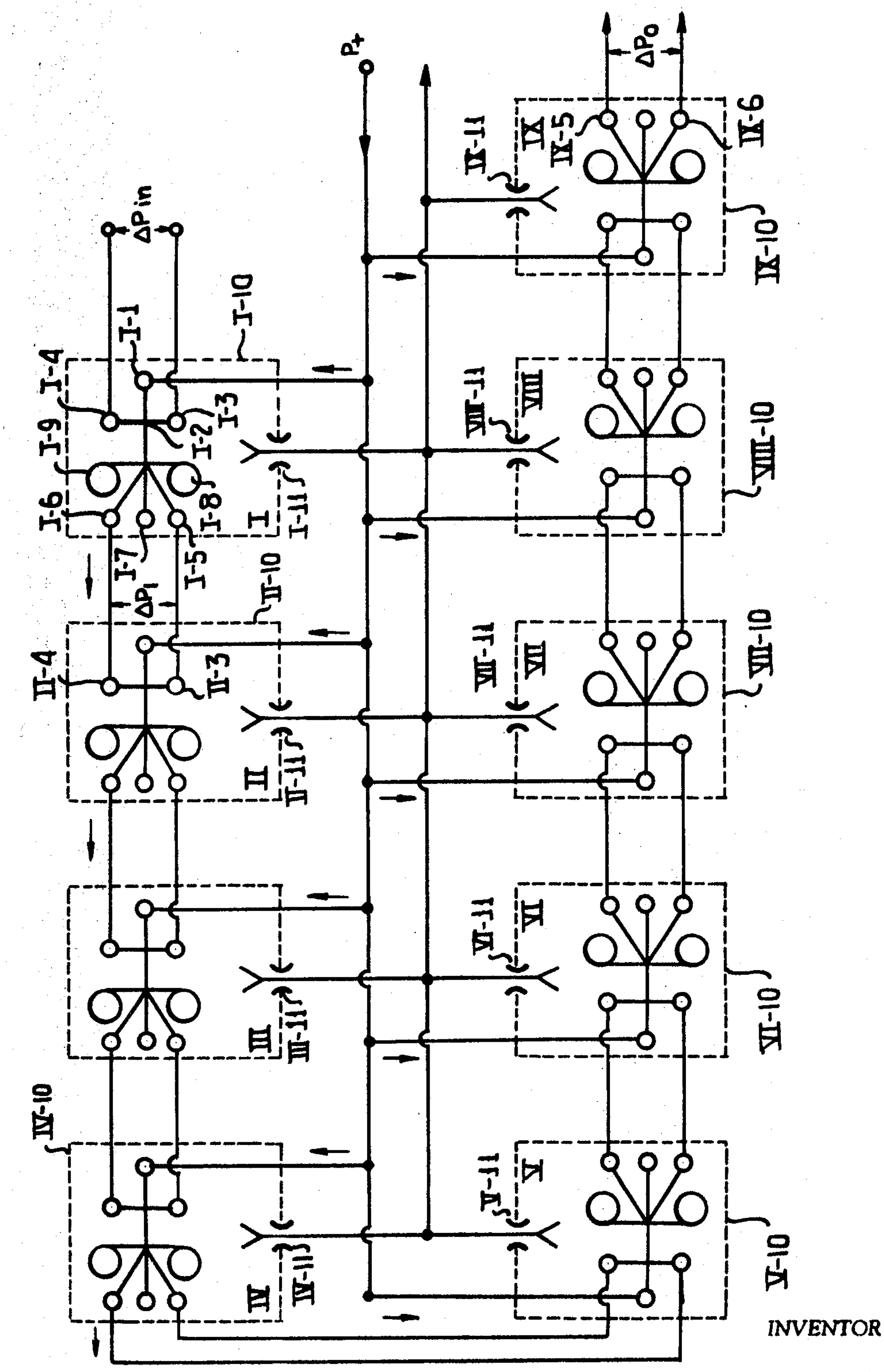
INVENTOR
CARMINE V. DiCAMILLO
BY Hurwitz, Rose & Greene
ATTORNEYS

SELF PRESSURIZING INTERACTION REGION

BACKGROUND OF THE INVENTION

The present invention relates to fluidic amplifiers, and more particularly to a fluidic amplifier circuit capable of amplifying the average pressure level as well as pressure excursions of an input signal.

Fluidic amplification is generally considered solely in terms of signal excursion. For example, if an amplifier input signal pressure variation of X produces an output signal pressure variation of 4X, the amplifier is said to have a gain of four. For many fluidic amplifier applications, signal excursion gain is all that need be considered. However, in some applications, a fluidic amplifier, in addition to providing amplified signal excursions, must provide an output signal at a substantially higher average pressure than that of the input signal.

At first glance one might consider simply increasing the power stream pressure in a stream interaction type amplifier to provide the desired average pressure level. However, if a power stream is issued at a relatively high pressure into an interaction region having a substantially lower pressure, the power stream tends to diffuse rather than be maintained as a defined stream. More specifically, it has been found that if the ratio of the interaction region pressure to the power stream pressure is less than approximately 0.53, the power stream will diffuse sufficiently to be useless for fluidic amplification purposes.

Another problem resulting from indiscriminate boosting of the power stream pressure is a reduction in signal excursion gain. More specifically, a high-pressure power stream reacts stiffly to low pressure control streams interacting therewith. Consequently the power stream becomes less sensitive to control signal excursions and the gain is significantly compromised.

Still another problem arising from very high power stream pressure is the back pressure problem in which signals cannot be fed forward to succeeding stages in a cascaded amplifier. Specifically, if the power stream pressure is too high and the interaction region is not sufficiently vented, the high interaction region pressure retards, and in some cases nullifies, the effect of lower pressure signals applied to the control ports.

It is therefore an object of the present invention to provide a fluidic amplifier capable of amplifying both the average pressure and pressure excursions of an input signal.

It is another object of the present invention to provide a cascaded fluid amplifier having the capability of amplifying both average pressure and pressure excursion and wherein the interaction region pressure is successively increased in succeeding stages.

It is still another object of the present invention to provide a technique for amplifying the average pressure of a fluid signal along with the excursion pressure without the problems presented by prior art techniques.

SUMMARY OF THE INVENTION

In accordance with the principles of the present invention, cascaded fluidic amplifier stages of the stream interaction type are employed and the interaction regions of succeeding stages are maintained at succeedingly higher pressure levels. The range of interaction region pressure levels permitted for a given stage is determined by the requirement that forward feed of the signal from the previous stage must not be significantly impeded by the interaction region pressure of said given stage, and by the requirement that the power stream pressure must not be so high relative to the interaction region pressure as to cause significant power stream diffusion.

In a preferred embodiment, a single supply pressure is applied to the power nozzle of each of the cascaded stages and the various interaction regions are vented as required to provide successively higher interaction region pressures. In one form, the individual amplifier stages are maintained in their own respective environments, for example a container, which communicate with ambient pressure only through a bleed orifice or restrictor of predetermined size. By making the bleed orifices of successive stages successively smaller, the environmental pressure in successive stages are successively increased as required to permit amplification of both signal excursions and average pressure.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein:

The FIGURE is a schematic drawing of a cascaded fluidic amplifier circuit employing the principles of the present invention.

DETAILED DESCRIPTION OF THE PREFERRED EMBODIMENTS

Referring to the FIGURE, a preferred embodiment of the present invention comprises a plurality (nine for purposes of the present description) of fluidic amplifier stages I, II, III, IV, V, VI, VII, VIII and IX, denominated in the order of their cascade sequence. Each stage, represented schematically in the FIGURE, is a proportional fluidic amplifier of the stream interaction type, and, by way of example, may be configured substantially identical to the amplifier illustrated and described in U.S. Pat. No. 3,275,013. Like ports, passages and nozzles in each amplifier stage are designated by like reference numerals, such numeral being preceded by a roman numeral to indicate the stage of which the element is a part. Stage I, for example, comprises a power nozzle I–1 responsive to application of pressurized fluid thereto for issuing a power stream into an interaction region designated generally as I–2. Left and right control ports, I–3 and I–4 respectively, are each responsive to fluid signals applied thereto for issuing respective oppositely directed control streams which deflect the power stream as a function of signal strength. Left and right output passages, I–5 and I–6 respectively, receive respective varying portions of the power stream as the latter is deflected. A central output passage I–7 and two sidewall vent passages I–8 and I–9 communicate between the interaction region I–2 and the environment immediately surrounding amplifier stage I.

A differential pressure input signal, $\Delta P_{in}$, is applied across control ports I–3 and I–4. The amplified differential pressure signal $\Delta P_I$ appearing across output passage I–5 and I–6 is applied across control ports II–3 and II–4 of stage II. In like manner the output passages 5 and 6 of each stage are respectively connected to control ports 3 and 4 of the next succeeding stage to achieve the connections required to provide a nine-stage cascaded amplifier.

A source of pressurized fluid, P+, is connected to the power nozzle 1 of each of stages I through IX. The pressure level of source P+ is equal to or greater than the average pressure level required for the circuit output signal, $\Delta Po$, derived across output passages IX–5 and IX–6 of stage IX.

Each stage is located within a respective one of enclosures I–10 through IX–10. Enclosures I–10 through IX–10 may take any appropriate shape or form in which it can contain its respective amplifier stage. All connections to and from each stage are made through pressuretight fittings so that there is no fluid leakage between the interior and exterior of the enclosure at the connections. A restrictor or bleed orifice 11 is provided through a wall of each enclosure 10 to provide the only fluid communication between the enclosure interior and exterior. Bleed orifices I–11 through IX–11 are of gradually decreasing size so that fluid bleeds from enclosure I–10 at a greater rate than from enclosures II–10 through IX–10 individually, and fluid bleeds from enclosure II–10 at a greater rate than from individual enclosures III–10 through IV–10, etc.

The interaction region I–2 of stage I communicates with the interior of enclosure I–10 through the various vent passages, for example passage I–7, I–8, and I–9. In conventional amplifiers these vent passages communicate directly with ambient and thus the interaction region pressure is prevented from building up. However, the enclosures 10 permit the interaction regions 2 to communicate with ambient only through bleed orifices 11 which significantly restrict the vent flow. Thus a substantial pressure builds up within the enclosures 10 and consequently in the interaction regions 2. The magnitude of the pressure build up is determined by the size of the bleed orifices, which, as mentioned above, are graduated in size in inverse order of their cascade sequence.

The sizes of the bleed orifices 11 are determined by the considerations discussed in the BACKGROUND section of the present application. More specifically, the interaction region pressure in each stage must be low enough to permit sensitive deflection of the power stream and to permit feed forward of the input signal from the previous stage and yet be high enough to permit issuance of the power stream into the interaction region without significant diffusion. The latter consideration requires that the ratio of interaction region pressure to power stream pressure be at least 0.53.

By way of example only, in an application of the present invention, using air as the working fluid, it was required to amplify a differential pressure of ±2 p.s.i. at an average pressure of 387 p.s.i.a. to an output differential pressure of over ±30 p.s.i. at an average pressure level of 648 p.s.i.a. To achieve this amplification, a P+ of 695 p.s.i.a. was employed and the bleed orifice area and steady state interaction region pressures were as indicated in Table A:

TABLE A

| | Orifice 11 area (in.$^3$) | Interaction region pressure (p.s.i.a.) |
|---|---|---|
| Stage: | | |
| I | $1.93\times10^{-3}$ | 413 |
| II | $1.62\times10^{-3}$ | 469 |
| III | $1.40\times10^{-3}$ | 514 |
| IV | $1.22\times10^{-3}$ | 550 |
| V | $1.07\times10^{-3}$ | 579 |
| VI | $9.44\times10^{-4}$ | 603 |
| VII | $8.40\times10^{-4}$ | 621 |
| VIII | $7.46\times10^{-4}$ | 636 |
| IX | $6.64\times10^{-4}$ | 648 |

Of course the above parameters were employed for a specific example only and are not limiting on the scope of the invention.

It is seen by virtue of the above example that the average pressure of a pressure signal applied to a cascaded fluidic amplifier circuit can be gradually increased on a stage-by-stage basis. The average pressure at each stage is chosen by the criteria described above. Excursion amplification, of course, proceeds as in conventional cascaded fluidic amplifier circuits; however, the novel feature of the present invention resides in providing large amplification of the average pressure level.

It will be appreciated that the power stream pressures applied to each stage need not be equal, but rather may be gradually increased on a stage-by-stage or group of stages-by-group of stages basis. Further, although enclosure 10 is employed in the preferred embodiment of the present invention, the interaction region pressure may be built-up in other ways. For example, controlled bleeding from the interaction may be had by connecting the various vent passages to ambient through channels in which a controlled restriction or orifice is located.

It will also be appreciated that the input signal need not be a differential pressure but may be a single-line pressure signal.

While I have described and illustrated one specific embodiment of my invention, it will be clear that variations of the details of construction which are specifically illustrated and described may be resorted to without departing from the true spirit and scope of the invention as defined in the appended claims.

I claim:

1. A fluidic amplifier circuit responsive to a variable pressure signal applied thereto at a relatively low average pressure level to provide an amplified version of said variable pressure signal at a relatively high average pressure level, said circuit comprising:

a plurality of fluidic amplifier elements of the stream interaction type, each amplifier element comprising an interaction region; a power nozzle responsive to application of pressurized fluid thereto for issuing a power stream of fluid into said interaction region, at least one control nozzle responsive to application of a pressure signal thereto for issuing a control stream into said interaction region in interacting relation with said power stream to deflect said power stream as a function of the signal pressure, and at least one output passage disposed for receiving varying portions of said power stream as a function of power stream deflection;

interstage connection means for providing fluid flow connections between the output passage of each of said stages and the control nozzle of a respective other stage so as to provide a plurality of cascade connected stages, each stage comprising one of said plurality of amplifiers;

means for applying said variable pressure input signal to the control nozzle of the amplifier element of the first of said stages; and means for establishing and maintaining respective predetermined pressure levels in the interaction regions of said amplifier elements, said predetermined pressure levels being successively higher in succeeding ones of said stages, the predetermined pressure level at each amplifier element being sufficiently high to prevent significant diffusing of said power stream and sufficiently low to permit forward feed of signal from the output passage of each stage to the interaction of the succeeding stage via said interstage connection means.

2. The circuit according to claim 1 wherein said amplifier elements each include a vent passage communicating between said interaction region and externally thereof and wherein said last-mentioned means comprises means for bleeding fluid from said interaction region via said vent passage to ambient at a respective preselected flow rate for each amplifier element.

3. The circuit according to claim 1 wherein said amplifier elements each include a vent passage communicating between said interaction region and externally thereof, said circuit further comprising a plurality of enclosures, each amplifier element being disposed within a respective enclosure, each enclosure communicating with the ambient environment externally thereto through a restrictor, the restrictor being sized for each enclosure to permit establishing and maintaining of said predetermined pressure level upon application of pressurized fluid to said power nozzle.

4. The circuit according to claim 3 wherein said restrictors decrease in size in successive stages.

5. The circuit according to claim 3 wherein said enclosures are of substantially the same size, wherein pressurized fluid of substantially the same pressure level is applied to each of said power nozzles, said same pressure level being greater than said relatively high average pressure level and wherein said restrictors have decreasing cross-sectional areas at successive stages of said circuit.

6. The circuit according to claim 3 wherein pressurized fluid of substantially the same pressure level is applied to each of said power nozzles, said same pressure level being greater than said relatively high average pressure level.

7. A fluidic amplifier for amplifying both the excursion and average pressure level of an input pressure signal, said amplifier comprising:

a proportional fluidic amplifier element of the stream interaction type comprising an interaction region, a power nozzle responsive to application of pressurized fluid thereto for issuing a power stream of fluid into said interaction region, a control nozzle responsive to application of said input pressure signal thereto for issuing a control stream into said interaction region to deflect said power stream as a function of said input pressure signal, an output passage for receiving a portion of said power stream as a function of power stream deflection, and a vent passage for providing fluid communication between said interaction region and the immediately surrounding environment of said amplifier element; and means for building up the pressure in said interaction region, said interaction region comprising an enclosure surrounding said amplifier element in its entirety, said enclosure having coupling means for permitting fluid connections to be made to said power nozzle, control nozzle, and output passage, said enclosure having aperture means defined therethrough for bleeding fluid from said interaction region via said vent passage to ambient at a bleed rate which is sufficiently slow to permit positive pressure build up in said interaction region such that the ratio of the pressure in said interaction region to the pressure of the issued power stream is at least 0.53.

8. The fluidic amplifier according to claim 7 further comprising a plurality of amplifier elements substantially identical to said first-mentioned amplifier element and interconnected in cascade relation, and a plurality of enclosures, one for each amplifier element, for establishing and maintaining successively higher interaction region pressures in successive ones of said cascaded amplifier elements, successive enclosures having successively smaller aperture means.